Figure 1:
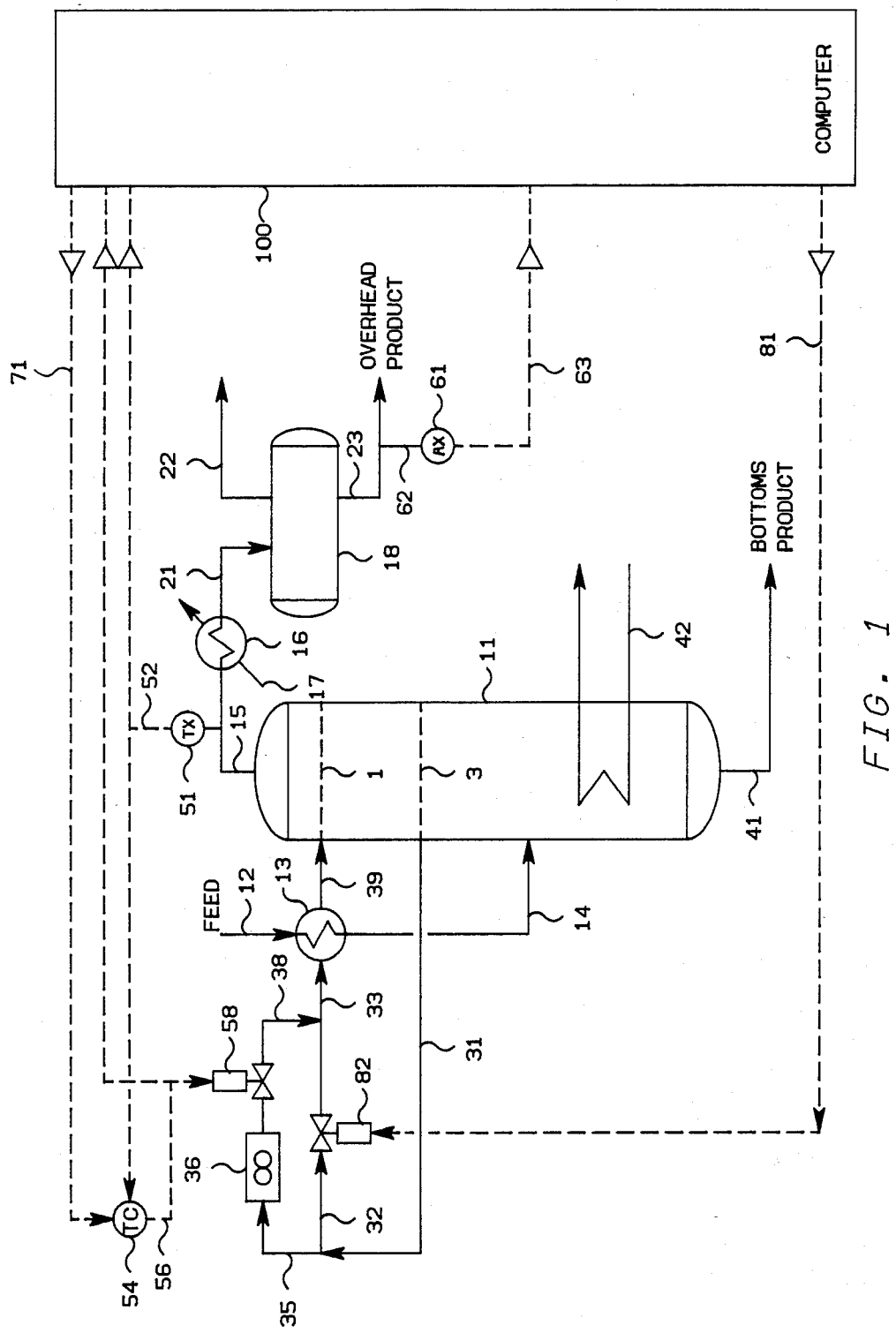

United States Patent [19]

DiBiano

[11] Patent Number: 4,506,334
[45] Date of Patent: Mar. 19, 1985

[54] FRACTIONAL DISTILLATION COLUMN CONTROL

[76] Inventor: Robert J. DiBiano, c/o Phillips Petroleum Company, Bartlesville, Okla. 74004

[21] Appl. No.: 436,882

[22] Filed: Oct. 26, 1982

[51] Int. Cl.³ .............................................. B01D 3/42
[52] U.S. Cl. .................................... 364/501; 196/132; 203/DIG. 18; 203/2; 202/160
[58] Field of Search ............... 364/501, 109, 500, 502, 364/108, 105, 106; 422/62, 119; 23/230 A; 196/14.52, 132; 203/1, DIG. 18, 2; 202/160

[56] References Cited

U.S. PATENT DOCUMENTS

| | | | |
|---|---|---|---|
| 3,377,548 | 4/1968 | Newbold | 323/100 |
| 3,392,088 | 7/1968 | Johnson | 203/1 |
| 3,446,710 | 5/1969 | Sissons, Jr. et al. | 202/160 |
| 3,676,066 | 7/1972 | Pennington | 23/198 |
| 4,230,534 | 10/1980 | Stewart | 364/501 X |
| 4,295,196 | 10/1981 | Furr | 364/501 |
| 4,371,426 | 2/1983 | DiBiano et al. | 364/501 X |
| 4,400,239 | 8/1983 | Hobbs | 364/501 X |
| 4,417,311 | 11/1983 | Ryan | 364/501 |

Primary Examiner—Edward J. Wise

[57] ABSTRACT

In a fractional distillation process in which a pump around stream is utilized to control heat removal from an upper portion of the fractional distillation column and in which the pump around stream is utilized to preheat the feed stream flowing to the fractional distillation column, control signals derived from an analysis of the overhead product stream from the fractional distillation column are utilized to substantially maximize the flow rate of the pump around stream. This results in a maximum preheating of the feed stream flowing to the fractional distillation column which improves the energy efficiency of the fractional distillation process. Also, a desired overhead product specification is maintained.

16 Claims, 2 Drawing Figures

FRACTIONAL DISTILLATION COLUMN CONTROL

This invention relates to control of a fractional distillation column. In one aspect this invention relates to method and apparatus for improving the energy efficiency of a fractional distillation column while maintaining a desired overhead product specification.

Heat is commonly added to a fractional distillation column through a fired reboiler heater or by circulating a heated fluid through the lower portion of the fractional distillation column. Heat is commonly removed from the fractional distillation column by overhead condensers. In some fractional distillation columns, closer control of the heat removal from the fractional distillation column is accomplished by using a combination of overhead condensers and a pump around stream which is withdrawn from the side of the fractional distillation column, circulated through a cooler, and returned to the fractional distillation column.

The amount of heat removed from a fractional distillation column directly determines the specifications of the overhead product. It is thus necessary to closely control the heat removal from the fractional distillation column if desired product specifications are to be obtained.

As has been previously stated, the pump around stream is generally circulated through a cooler prior to returning to the fractional distillation column. The feed stream flowing to the fractional distillation column may be passed through the cooler and in this way the pump around stream is cooled while the feed stream is heated. This reduces the heat that must be supplied to the fractional distillation column through a fired reboiler heater or a heated fluid which is circulated through a lower portion of the fractional distillation column and thus improves the energy efficiency of the fractional distillation process.

It is thus an object of this invention to improve the energy efficiency of a fractional distillation process by substantially maximizing the flow rate of the pump around stream while minimizing cooling of the pump around stream other than by use of the heat exchanger through which the feed to the fractional distillation column is flowing and while also maintaining a desired product specification for the overhead product.

In accordance with the present invention, method and apparatus is provided whereby control signals derived from an analysis of the overhead product stream are utilized to substantially maximize the flow rate of the pump around stream. This results in a maximum preheating of the feed stream flowing to the fractional distillaiton column which improves the energy efficiency of the fractional distillation process. Also, because the control signals are based on an analysis of the overhead product stream, a desired overhead product specification is maintained.

In a typical fractional distillation process, a cooling system which is typically referred to as an air cooler or fin-fan cooler is utilized to cool the pump around stream. Essentially, the flow rate of the pump around stream is maximized in accordance with the present invention by bypassing substantially all of the pump around stream around the air cooling system. However, some flow is maintained through the air cooling system so as to allow the air cooling system to respond readily to process upsets.

Figure 2:
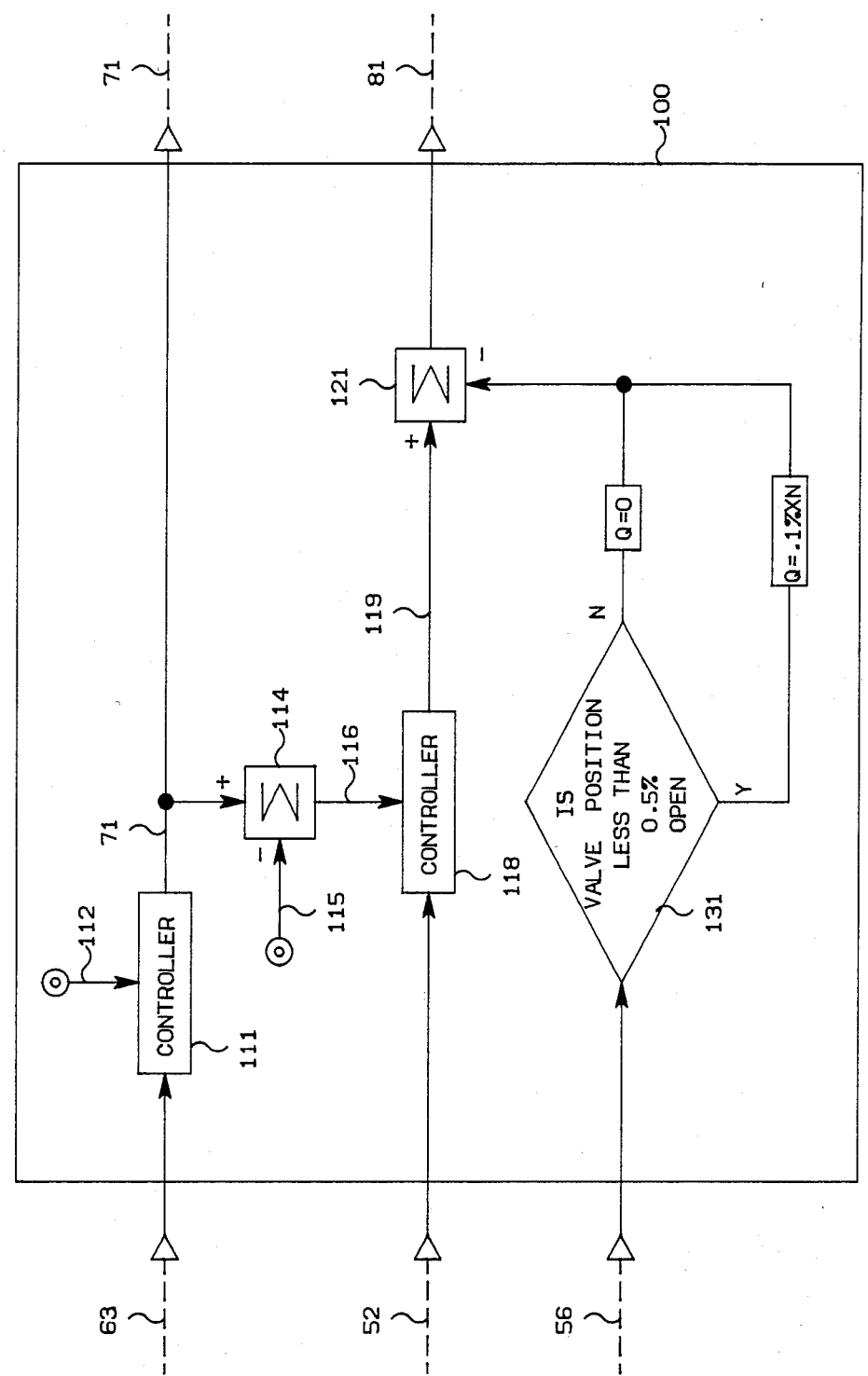

Other objects and advantages of the invention will be apparent from the foregoing brief description of the invention and the claims as well as the detailed description of the drawings which are briefly described as follows:

FIG. 1 is an illustration of a fractional distillation column and the associated control system of the present invention; and FIG. 2 is an illustration of the computer logic utilized to derive the control signals based on process measurements.

The invention is illustrated and described in terms of a crude oil distillation column in which crude oil is fractionated. However, the invention is applicable to any fractional distillation column in which a pump around stream is utilized to provide heat removal from the fractional distillation column and in which the heat contained in the pump around stream is utilized for heating of another process stream.

A specific control system configuration is set forth in FIG. 1 for the sake of illustration. However, the invention extends to different types of control system configurations which accomplish the purpose of the invention. Lines designated as signal lines in the drawings are electrical in this preferred embodiment. Transducing of the signals from analog form to digital form or from digital form to analog form is not illustrated because each transducing is also well known in the art.

The invention is also applicable to pneumatic, mechanical, hydraulic or other signal means for transmitting information. In almost all control system some combination of eledctrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Other types of computing devices could also be used in the invention. The ditital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral controllers are utilized by any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms of formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated a fractional distillation column 11 which is utilized to fractionate a crude oil feed into a variety of products. For the sake of simplicity, only the overhead vapor product, light naphtha product and bottoms product are illustrated in FIG. 1. The crude oil feed is supplied to the fractional distillation column 11 through the combination of conduit means 12, heat exchanger 13 and conduit means 14.

An overhead stream is withdrawn from the fractional distillation column 11 through a conduit means 15 and is provided to the heat exchanger 16. The heat exchanger 16 is provided with a cooling medium flowing through conduit means 17. The partially condensed fluid stream from the heat exchanger 16 is provided to the overhead accumulator 18 through conduit means 21. The portion of the fluid stream flowing through conduit means 21 which remains in vapor form is withdrawn from the overhead accumulator 18 through conduit means 22 as a fuel gas. The liquid portion of the fluid stream flowing through conduit means 21 is withdrawn from the accumulator 18 through conduit means 23.

The fractional distillation column 11 contains a plurality of trays of which only trays 1 and 3 are illustrated. A top pump around stream is withdrawn from tray 3 of the fractional distillation column through conduit means 31. The top pump around stream may be provided directly to the heat exchanger 13 through the combination of conduit means 31, 32 and 33 or may be provided indirectly to the heat exchanger 13 through the combination of conduit means 31 and 35, air cooler 36, and conduit means 38 and 33. The air cooler 36 can be utilized to provide cooling to the top pump around stream returning to the fractional distillation column 11. The top pump around stream flowing through conduit means 33 is provided to tray 1 of the fractional distillation column through conduit means 39.

A bottom stream generally containing reduced crude is withdrawn from the fractional distillation column 11 through conduit means 41. Heat is supplied to the fractional distillation column 11 by heating fluid flowing through conduit means 42.

A number of other streams would generally be withdrawn from or provided to a fractional distillation column which is utilized to separate crude oil into various components. For the sake of simplicity, these streams have not been illustrated in FIG. 1. Also, the many pumps, additional heat exchanges, additional control components and other typical fractional distillation column equipment have not been illustrated for the sake of simplicity.

Temperature transducer 51 in combination with a temperature measuring device such as a thermocouple, which is operably located in conduit means 15, provides an output signal 52 which is representative of the temperature of the fluid flowing through conduit means 15. Signal 52 is provided from the temperature transducer 51 as an input to computer 100 and is also provided as the process variable input to the temperature controller 54.

The output signal 56 from the temperature controller 54 controls the position of the control valve 58, which is operably located in conduit means 38, and is thus representative of the position of the control valve 58 as will be described more fully hereinafter. Signal 56 is not only provided as a control signal to the control valve 58 but is also provided to computer 100.

Cut point analyzer 61 is connected to conduit means 23 through conduit means 62. A sample of the light naphtha product flowing through conduit means 23 is provided through conduit means 62 to the cut point analyzer 61. The sample is preferably heated in the cut point analyzer 61 until 90 percent of the sample is vapor. Signal 63 is representative of the temperature required to vaporize 90 percent of the sample. Signal 63 is provided from the end point analyzer 61 to computer 100. Other types of analyzers could be utilized to control the product specification of the light naphtha product. Also, different cut points or an end point could be utilized if desired.

In response to the described inputs, two control signals are provided by computer 100. Control signal 71 is representative of the temperature of the overhead stream flowing through conduit means 15 required to maintain a desired cut point for the overhead product stream flowing through conduit means 23. Signal 71 is provided as the set point input to the temperature controller 54.

In response to signals 71 and 52, the temperature controller 54 provides an output signal 56 which is responsive to the difference between signals 71 and 52. Signal 56 is scaled so as to be representative of the valve position of control value 58 required to maintain the actual temperature of the overhead stream flowing through conduit means 15 substantially equal to the desired temperature represented by signal 71 as has been previously stated. Control valve 58 is manipulated in response to signal 56. Essentially, signal 56 may be considered as being representative of the amount of cooling which should by supplied from the air cooler 36 so as to maintain a desired overhead product specification.

Signal 81 is representative of the desired position of the control valve 82 which is operably located in conduit means 32. Control valve 82 is manipulated in response to signal 81. As will be described more fully hereinafter, signal 81 is essentially representative of the position of the control valve 82 which would maintain the actual temperature of the overhead stream flowing through conduit means 15 at some predetermined temperature below the desired temperature represented by signal 71 (a temperature one-half degree lower than the desired temperature represented by signal 71 is preferably utilized).

The manner in which the control signals are generated is illustrated in FIG. 2. Referring now to FIG. 2, signal 63, which is representative of the actual 90% cut point temperature, is supplied as the process variable input to the controller block 111. Signal 112 which is representative of the desired 90% cut point temperature of the overhead product stream, is supplied as the set point input to the controller block 111. In response to signals 63 and 112, the controller block 111 provides an output signal 71 which is scaled so as to be representative of the temperature of the overhead stream flowing through conduit means 15 required to maintain the actual 90% cut point temperature represented by signal 63 substantially equal to the desired 90% cut point temperature represented by signal 112. Signal 71 is provided to the minuend input to the summing block 114 and is also provided as an output signal from computer 100 and utilized as previously described.

Signal 115, which is preferably representative of 0.5° F., is provided to the subtrahend input of the summing block 114. Signal 115 is subtracted from signal 71 to establish signal 116 which is representative of a temperature 0.5° F. below the desired temperature represented by signal 71. Signal 116 is provided from the summing block 114 as the set point input to the controller block 118.

Signal 52, which is representative of the actual temperature of the overhead stream, is provided as the process variable input to the controller block 118. In response to signals 116 and 52, the controller block 118 provides an output signal 119 which is scaled so as to be representative of the position of the control valve 82 illustrated in FIG. 1 required to maintain the actual overhead temperature represented by signal 52 substantially equal to the temperature represented by signal 116. Signal 119 is provided from the controller block 118 to the minuend input of the summing block 121.

The invention may be more clearly understood by pausing in the description at this point to consider what the effect of supplying signal 119 directly as signal 81 to the control valve 82 would be if no other control action were taken other than the control action required by signals 71 and 81. Essentially, control valve 82 would open slowly since an increase in the flow rate of the pump around stream will result in a decrease in the overhead temperature. However, at the same time, control valve 58 would be closed slowly in an effort to maintain the overhead temperature substantially equal to the desired temperature represented by signal 71. This control action would continue until control valve 58 was fully closed at which time control valve 82 would continue to open until the overhead temperature reaches the temperature represented by signal 116. This would result in maximizing the flow rate of the pump around stream which is the intent of the present invention but it would render the air cooler substantially useless with respect to making rapid responses if a process upset should occur because a substantial length of time is required to move a control valve from a fully closed position to a position which allows a consequential flow of fluid. Also, the control valve 58 could not react to remove less heat if it were fully closed in the case of a process upset.

In an effort to maintain the availability of the air cooler 36 to respond rapidly to process upsets, the control action previously described is allowed to continue until the control valve 58 reaches a maximum desired closed position (2 percent open in the present case). At this point, the integral action of the temperature controller 54 is disabled. The result is that the control valve 82 will continue to open until the overhead temperature reaches the temperature represented by signal 116. This will create a difference between signals 52 and 71 which would normally result in the integral action of the temperature controller causing the control valve 58 to continue to close. However, since the integral action of the temperature controller 54 has been disabled, the output signal from the temperature controller 54 will cause the control valve 58 to close only slightly and the control valve 58 will remain in that position so long as a process upset does not occur.

Temperature controller 54 is preferably a TDC 2000 Distributed Control manufactured by Honeywell, Phoenix, Ariz. The TDC 2000 contains a provision for disabling the integral action automatically if the output signal reaches a predetermined value as is more fully set forth in the instruction manuals of the TDC 2000. Other controllers containing such a function could be utilized if desired or other methods for disabling the integral action of a controller could be utilized.

If a process upset occurs such that the overhead temperature is driven substantially below the desired overhead temperature represented by signal 71 despite the action of control valve 82, it is possible for the control valve 58 to be closed more fully than 2 percent open. If the control valve 58 should be closed more than 0.5 percent open, it is preferred to force the control valve 82 to begin to close which will enable control valve 58 to eventually be opened more fully. This is accomplished by supplying signal 56, which is representative of the actual position of the control valve 58, to the logic block 131. In the logic block 131, a determination is made as to whether the valve position is less than 0.5 percent open. If the decision is no, the term Q is set equal to 0 and the control signal 81 provided from the computer 100 will have the magnitude of signal 119. If the answer is yes, the term Q is set equal to (0.1%×n) where n is the number of times that signal 81 has been calculated while the valve position of control valve 58 is less than 0.5 percent open. This value is subtracted from signal 119 in the summing block 121 to establish the control signal 81.

As an example, if the magnitude of signal 81 is being calculated every ten seconds and the control valve 58 has been less than 0.5 percent open for 100 seconds, the valve position represented by signal 81 will be 1 percent less open than the valve position represented by signal 119. In this manner, the control valve 82 will be slowly closed until such time as the valve position of control valve 58 is more than 0.5 percent open.

In summary, the control system of the present invention acts to maximize the flow rate of the pump around stream flowing through conduit means 31 by substantially minimizing the use of the air cooler 36 but without completely stopping the flow of fluid through the air cooler 36. In this manner, most of the waste heat available in the pump around is utilized to preheat the feed stream and only a small amount of heat is lost in the air cooler. However, the air cooler is still available to make rapid control moves in the case of a process upset. Finally, all of these control actions are accomplished while still maintaining a desired overhead product specification.

The invention has been described in terms of a preferred embodiment as illustrated in FIGS. 1 and 2. Specific components used in the practice of the invention as illustrated in FIG. 1 such as temperature transducer 51, temperature controller 54 and control valves 58 and 82 are each well known, commercially available control components such as are described at length in Perry's *Chemical Engineer's Handbook*, 4th Edition, Chapter 22, McGraw-Hill.

A suitable analyzer for determining the 90 percent cut point of the light naphtha product is the Totco Boiling Point Analyzer, manufactured by Totco, Glendale, Calif.

While the invention has been described in terms of the presently preferred embodiment, reasonable variations and modifications are possible by those skilled in the art and such variations and modifications are within the scope of the described invention and the appended claims.

That which is claimed is:

1. Apparatus comprising:
   a fractional distillation column means;
   a heat exchanger means;
   means for supplying a feed stream through said heat exchanger means to said fractional distillation column means;
   means for withdrawing a pump around stream from a first upper portion of said fractional distillation column means and for passing said pump around stream through said heat exchange means to a second upper portion of said fractional distillation column means, wherein said second upper portion is above said first upper portion;
   a first cooling means;
   means for diverting said pump around stream through said first cooling means;
   a second cooling means;
   an overhead accumulator means;
   means for withdrawing an overhead vapor stream from an upper portion of said fractional distillation column means and for passing said overhead vapor stream through said first cooling means to said overhead accumulator means;
   means for withdrawing a liquid stream from said overhead accumulator means as an overhead product stream;
   means for establishing a first signal representative of a desired specification for said overhead product stream;
   means for establishing a second signal representative of the actual value of said desired specification for said overhead product stream;
   means for comparing said first signal and said second signal and for establishing a third signal which is responsive to the difference between said first signal and said second signal, wherein said third signal is scaled so as to be representative of the temperature of said overhead vapor stream required to maintain the actual value of said desired specification substantially equal to the desired value represented said first signal;
   means for establishing a fourth signal representative of the actual temperature of said overhead vapor stream;
   means for comparing said third signal and said fourth signal and for establishing a fifth signal which is responsive to the difference between said third signal and said fourth signal;
   means for manipulating the flow rate of said pump around stream through said first cooling means in response to said fifth signal;
   means for subtracting a desired temperature from said third signal to establish a sixth signal;
   means for comparing said fourth signal and said sixth signal and for establishing a seventh signal which is responsive to the difference between said fourth signal and said sixth signal; and
   means for manipulating the flow rate of the portion of said pump around stream which is not passed through said first cooling means in response to said seventh signal.

2. Apparatus in accordance with claim 1 wherein the specification for said overhead product stream is a desired cut point temperature for said overhead product stream.

3. Apparatus in accordance with claim 1 wherein said means for comparing said third signal and said fourth signal comprises a proportional-integral controller and wherein said fifth signal is scaled so as to be representative of the position of a control valve, operably located in said means for diverting said pump around stream through said first cooling means, required to maintain the desired temperature represented by said third signal substantially equal to the actual temperature of said overhead stream and wherein said means for manipulating the flow of said pump around stream through said first cooling means in response to said fifth signal comprises means for manipulating said control valve in response to said fifth signal.

4. Apparatus in accordance with claim 3 additionally comprising means for disabling the integral action of said proportional-integral controller if said control valve is closed beyond a desired value.

5. Apparatus in accordance with claim 4 wherein the integral action of said proportional-integral controller is disabled if said control valve is less than 2 percent open.

6. Apparatus in accordance with claim 4 wherein a value for said seventh signal is calculated periodically.

7. Apparatus in accordance with claim 6 additionally comprising:

means for comparing said fifth signal to a minimum desired opening of said control valve; and means for subtracting a desired valve position from said seventh signal each time said seventh signal is calculated if the magnitude of said fifth signal is less than said minimum desired opening of said control valve.

8. Apparatus in accordance with claim 7 wherein said minimum desired opening of said control valve is 0.5 percent open and the desired valve position subtracted from said seventh signal is 0.1 percent.

9. A method for controlling a fractional distillation process, wherein a feed stream to a fractional distillation column is preheated by a pump around stream which is withdrawn from a first upper portion of said fractional distillation column and returned to a second upper portion of said fractional distillation column which is above said first upper portion of said fractional distillation column, wherein a portion of said pump around stream is diverted through a first cooling means, wherein an overhead vapor stream is withdrawn from an upper portion of said fractional distillation column, cooled, and separated into a liquid phase and a vapor phase and wherein said liquid phase is withdrawn as an overhead product stream, said method comprising the steps of:

establishing a first signal representative of a desired specification for said overhead product stream;

establishing a second signal representative of the actual value of said desired specification for said overhead product stream;

comparing said first signal and said second signal and establishing a third signal which is responsive to the difference between said first signal and said second signal, wherein said third signal is scaled so as to be representative of the temperature of said overhead vapor stream required to maintain the actual value of said desired specification substantially equal to the desired value represented said first signal;

establishing a fourth signal representative of the actual temperature of said overhead vapor stream;

comparing said third signal and said fourth signal and establishing a fifth signal which is responsive to the difference between said third signal and said fourth signal;

manipulating the flow rate of said pump around stream through said first cooling means in response to said fifth signal;

subtracting a desired temperature from said third signal to establish a sixth signal;

comparing said fourth signal and said sixth signal and establishing a seventh signal which is responsive to the difference between said fourth signal and said sixth signal; and manipulating the flow rate of the portion of said pump around stream which is not passed through said first cooling means in response to said seventh signal.

10. A method in accordance with claim 9 wherein the specification for said overhead product stream is a desired cut point temperature for said overhead product stream.

11. A method in accordance with claim 9 wherein a proportional-integral controller is used to compare said third signal and said fourth signal and wherein said fifth signal is scaled so as to be represehtative of the position of a control valve, operably located so as to control the diverting of said pump around stream through said first cooling means, required to maintain the desired temperature represented by said third signal substantially equal to the actual temperature of said overhead stream and wherein said step of manipulating the flow of said pump around stream through said first cooling means in response to said fifth signal comprises manipulating said control valve in response to said fifth signal.

12. A method in accordance with claim 11 additionally comprising the step of disabling the integral action of said proportional-integral controller if said control valve is closed beyond a desired value.

13. A method in accordance with claim 12 wherein the integral action of said proportional-integral controller is disabled if said control valve is less than 2 percent open.

14. A method in accordance with claim 12 additionally comprising the step of calculating a value for said seventh signal periodically.

15. A method in accordance with claim 14 additionally comprising the steps of:

comparing said fifth signal to a minimum desired opening of said control valve; and subtracting a desired valve position from said seventh signal each time said seventh signal is calculated if the magnitude of said fifth signal is less than said minimum desired opening of said control valve.

16. A method in accordance with claim 15 wherein said minimum desired opening of said control valve is 0.5 percent open and the desired valve position subtracted from said seventh signal is 0.1 percent.

* * * * *